Patented Nov. 28, 1922.

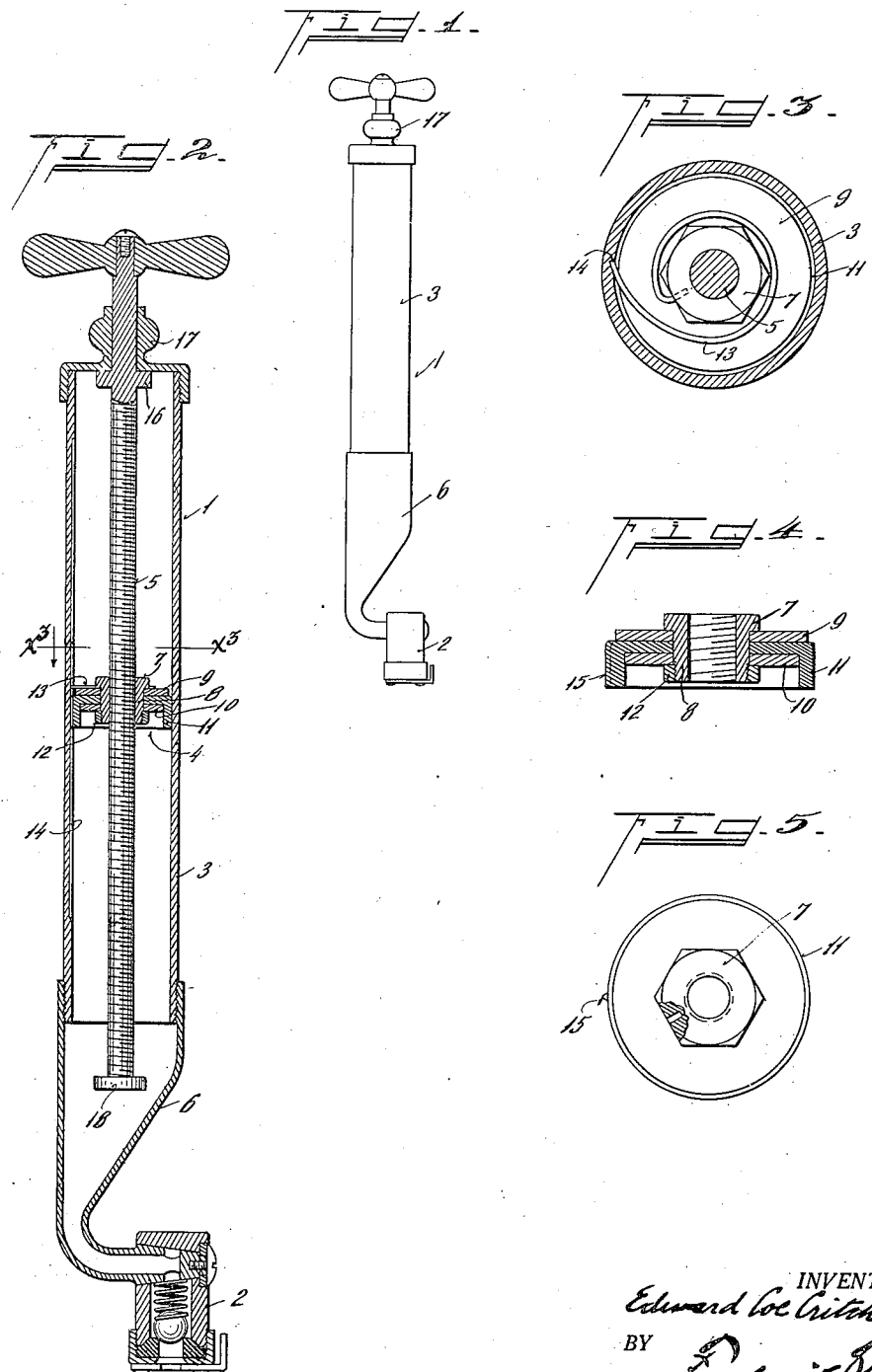

1,437,169

UNITED STATES PATENT OFFICE.

EDWARD COE CRITCHLOW, OF ORCUTT, CALIFORNIA.

LUBRICATOR.

Application filed January 10, 1921. Serial No. 436,163.

*To all whom it may concern:*

Be it known that I, EDWARD COE CRITCHLOW, a citizen of the United States, and a resident of Orcutt, in the county of Santa Barbara and State of California, have invented certain new and useful Improvements in Lubricators, of which the following is a specification.

This is a continuation in part of my prior application for patent for lubricator, filed March 8, 1920, Serial No. 364,118, and this invention relates to a lubricator adapted to facilitate the supplying of lubrication to bearings and other parts of vehicles and other machinery adapted to be charged with the lubricant.

An object of the invention is to make it possible to operate the plunger of the lubricator without it being necessary to have the plunger operating rod protrude to any great extent from the cylinder of the pump.

The accompanying drawings illustrate the invention:

Figure 1 is a longitudinal elevation of a lubricator constructed in accordance with the provisions of this invention;

Figure 2 is an enlarged sectional elevation of the lubricator;

Figure 3 is an enlarged plan view, partly in section, on line indicated by $x^3$—$x^3$, Figure 2;

Figure 4 is an enlarged sectional elevation of the plunger shown in Figure 2; and Figure 5 is an enlarged plan view of the plunger, the nut being shown partly in section.

The lubricator is indicated in general by the character 1 and is provided at its discharge end with a nozzle 2 which is not a part of this invention but has been disclosed and claimed in the parent application noted above. The gun comprises a cylinder 3 in which works a plunger 4 that is given longitudinal movement in the cylinder by a screw threaded stem 5.

The cylinder 3 is screw threaded or otherwise joined to a tube 6, on the tip of which is swiveled the nozzle 2.

The plunger is constructed as follows: The plunger comprises a nut 7 which engages the screw threads 8 of the stem 5. The nut 7 is provided with a reduced portion 8 which extends through washers 9, 10, and also through a cupped washer 11 formed of any suitable material. The washer 11 is inserted between the washers 9, 10. Engaging the nut 7 is a second nut 12 which holds the washers in place. Means are provided to prevent turning of the plunger 4 when the stem 5 is turned and, in this instance, for this purpose there is fastened to the nut 7 a coil spring 13 which has its outer end engaging a groove 14 extending longitudinally of the cylinder 3 in the inner face thereof. Besides the spring 13 engaging the groove 14, the washer 11, especially if of leather or other relatively soft material, will tend, in use, to thrust into the groove 14 so as to form a tongue 15 engaging said groove. If the washer 11 be of metal, the tongue 15 may be previously formed on the periphery of said washer and this tongue 15 is clearly shown in Figure 5 of the drawings.

The stem 5 is provided with a shoulder 16 which engages the end cap 17 of the cylinder to prevent outward movement of the stem when said stem is turned to force the plunger 4 toward the inner end of said stem. If desired, the plunger may be prevented from coming off of the stem 5 by providing the inner end of the stem with an abutment 18.

The invention operates as follows: When it is desired to apply grease or other form of lubricant to any particular bearing surface of a vehicle or other machine, the nozzle 2 will be connected with the bearing in a manner clearly described in my above identified application for patent, Serial No. 364,118. The operator will then turn the stem 5 in a direction to move the plunger 4 toward the tube 6 so as to bring pressure to bear upon the lubricant, not shown, in the cylinder 3 in front of the plunger. The pressure thus applied will force the lubricant through the tube 6, thence through the nozzle 2 to the part to be lubricated.

When the operator has expelled substantially all of the lubricant from the cylinder 3, the plunger 4 will have been moved to such position as to cause the tongue 15 and spring 13 to pass from the groove 14 and the plunger will thereupon be free to rotate when the stem 5 is turned, thus indicating to the operator that the cylinder 3 requires refilling with lubricant. The refilling can be effected by removing the cap 17 and the stem 5, together with the plunger 4, or the tube 6 may be removed from the cylinder and the lubricant applied in front of the plunger without removing the cap, stem and plunger.

I claim:

1. In a lubricator, a cylinder, a screw threaded stem extending into the cylinder and provided with a shoulder to engage one end thereof, a plunger engaging the screw threads of the stem, there being a groove extending longitudinally of the cylinder, and a yielding member on the plunger engaging the groove, the stem extending below the level of the groove.

2. In a lubricator, a cylinder having a groove extending only part way of the length of the cylinder, a screw-threaded stem extending into the cylinder and provided with a shoulder to engage one end thereof, a plunger engaging the screw-threads of the stem, and a coil spring fastened at one end to the plunger and having its other end engaging the groove.

Signed at Santa Maria, California this 27th day of December, 1920.

EDWARD COE CRITCHLOW.

Witnesses:
MARGUERITE WALKER.
E. F. EDWARDS.